United States Patent

[11] 3,619,457

| [72] | Inventors | Wesley M. Chandler<br>St. Paul;<br>Paul F. Heuser, St. Paul; Bernard T. Juba, White Bear Lakes, all of Minn. |
|---|---|---|
| [21] | Appl. No. | 822,750 |
| [22] | Filed | Sept. 20, 1968<br>Division of Ser. No. 625,244, Mar. 22, 1967, abandoned |
| [45] | Patented | Nov. 9, 1971 |
| [73] | Assignee | Thermoform Plastics, Inc.<br>St. Paul, Minn. |

[54] METHOD OF FORMING STRUCTURAL UNITS
2 Claims, 38 Drawing Figs.

[52] U.S. Cl. .................................................. 264/256, 264/DIG. 57
[51] Int. Cl. ..................................................... B28b 1/16
[50] Field of Search ......................................... 264/256, DIG. 57

[56] References Cited
UNITED STATES PATENTS

| 1,162,172 | 11/1915 | Jones | 264/DIG. 57 |
| 2,850,890 | 9/1958 | Rubenstein | 264/228 |
| 2,921,463 | 1/1960 | Goldfein | 264/261 |
| 3,217,077 | 11/1965 | Cocke | 264/256 |
| 2,817,619 | 12/1957 | Bickel et al. | 264/256 (X) |
| 3,246,057 | 4/1966 | Simonson | 264/35 |
| 3,419,454 | 12/1968 | Hoffman | 264/256 (X) |
| 3,439,076 | 4/1969 | Loois | 264/256 (X) |
| 3,439,461 | 4/1969 | Chandler et al. | 264/256 (X) |

OTHER REFERENCES

Rooney H. A. & Bolts E. D., Epoxy Adhesives as Structural Repair Material, Calif. Highways and Public Works, Sep.-Oct. 1956.

*Primary Examiner*—Robert F. White
*Assistant Examiner*—Gene Auville
*Attorney*—Schroeder, Siegfried & Ryan ABSTRACT: This invention relates to structural units such as structural building units, which may be used for building wall and flood panels, floor tile, prestressed concrete, building beams and columns, telephone poles, guard poles, and the like, storage silos, chemical storage vats and tanks, septic tanks, concrete steps, railroad ties, telephone and telegraph terminal boxes, building blocks, shower stalls and tubs, pipes for sewage and water transmission, burial vaults, cremation urns, and other articles and products, of superior structural and tensile strength and attractive appearance. Each of the structural units of the present invention comprises a first component which is preferably a plastic resinous component providing at least a portion of the mold surface for a second component; a second component of portland cement concrete mix or lightweight aggregate cement mix, industrial molding plaster, or so-called "tooling plaster," or like materials, formed against the mold surface of the resin component; and an adhesive bonding agent between the mold surface of the first or resin component and the second concrete or molding plaster component formed thereon and cured in situ and adhesively bonding the resin component and the concrete or molding plaster component together to form the said structural unit.

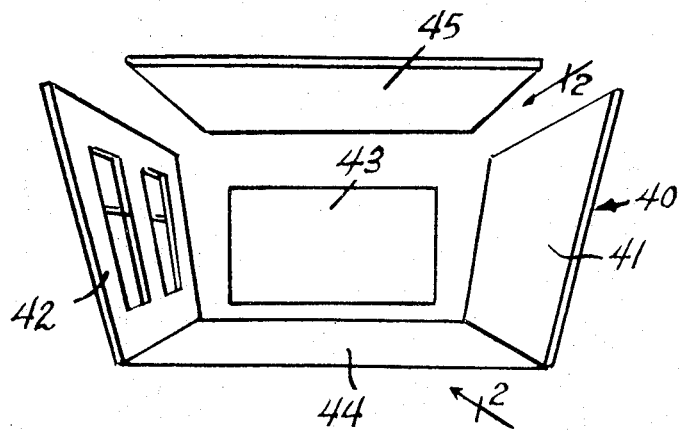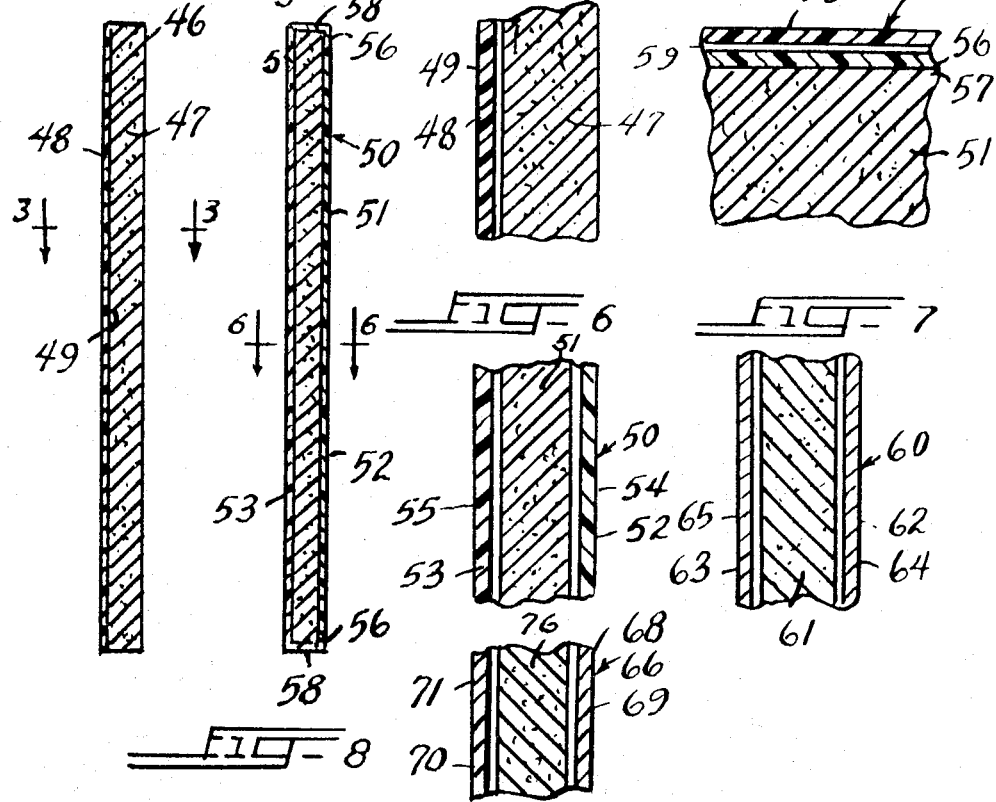

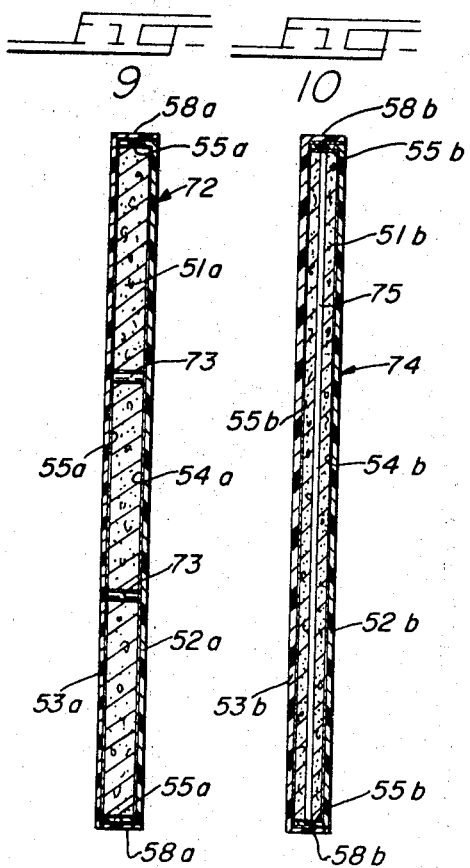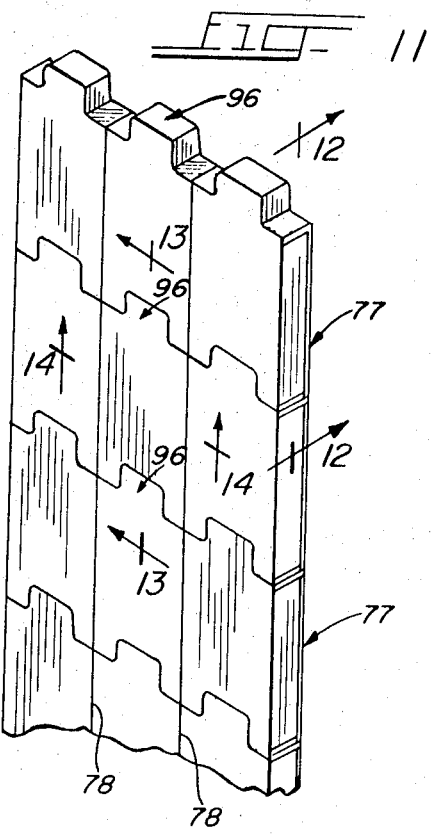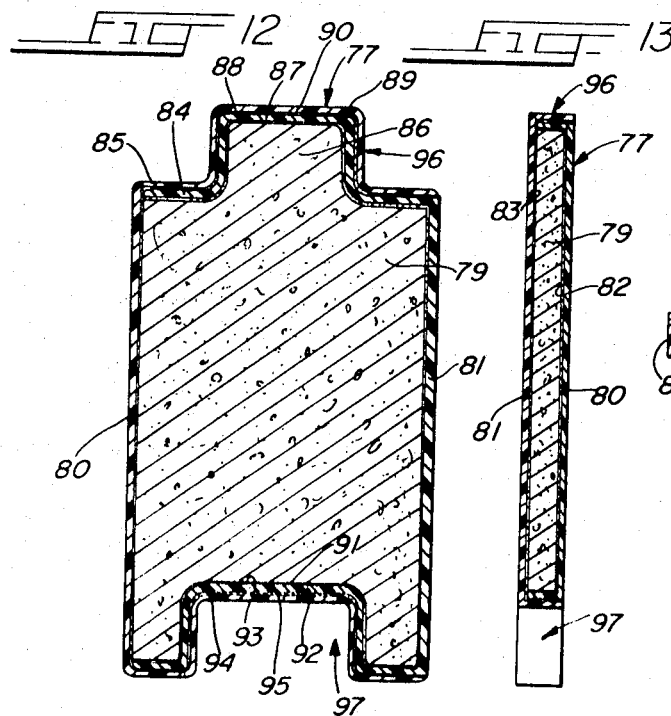

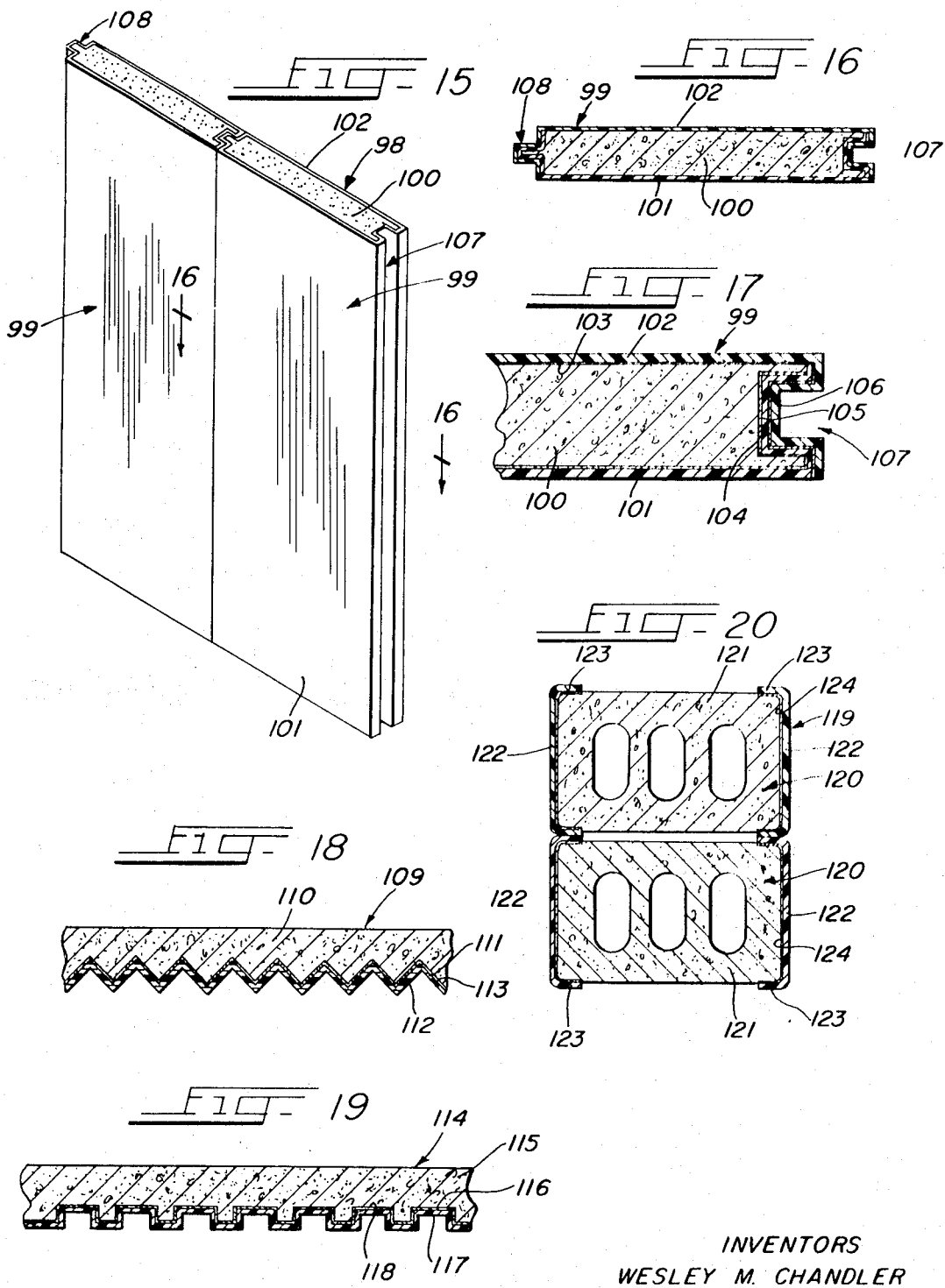

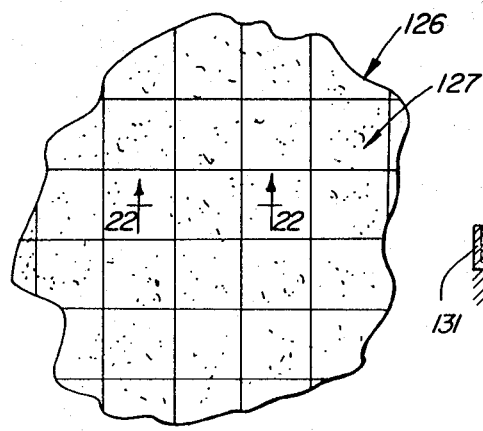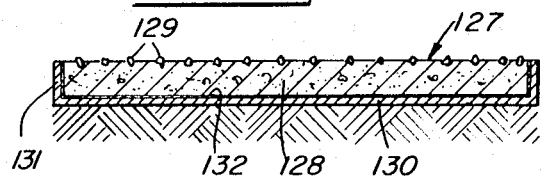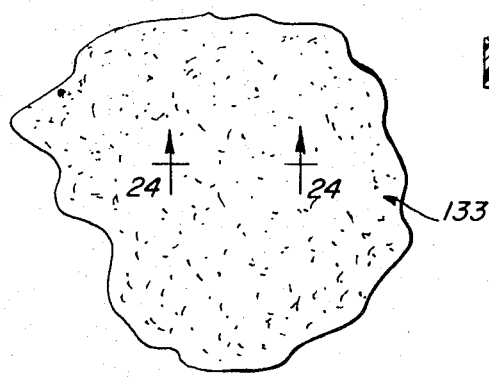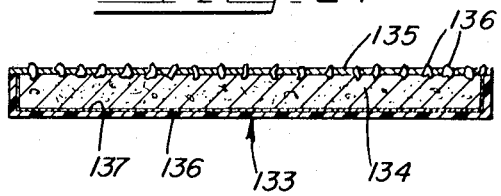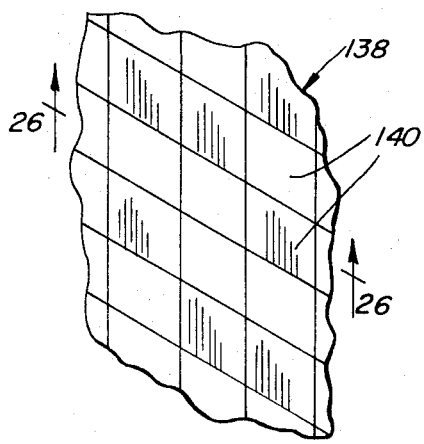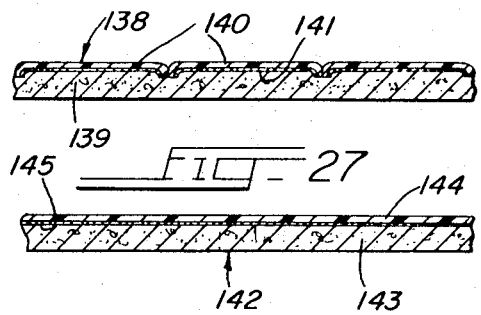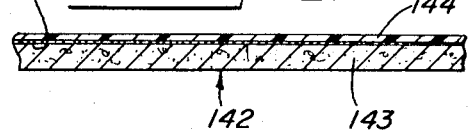

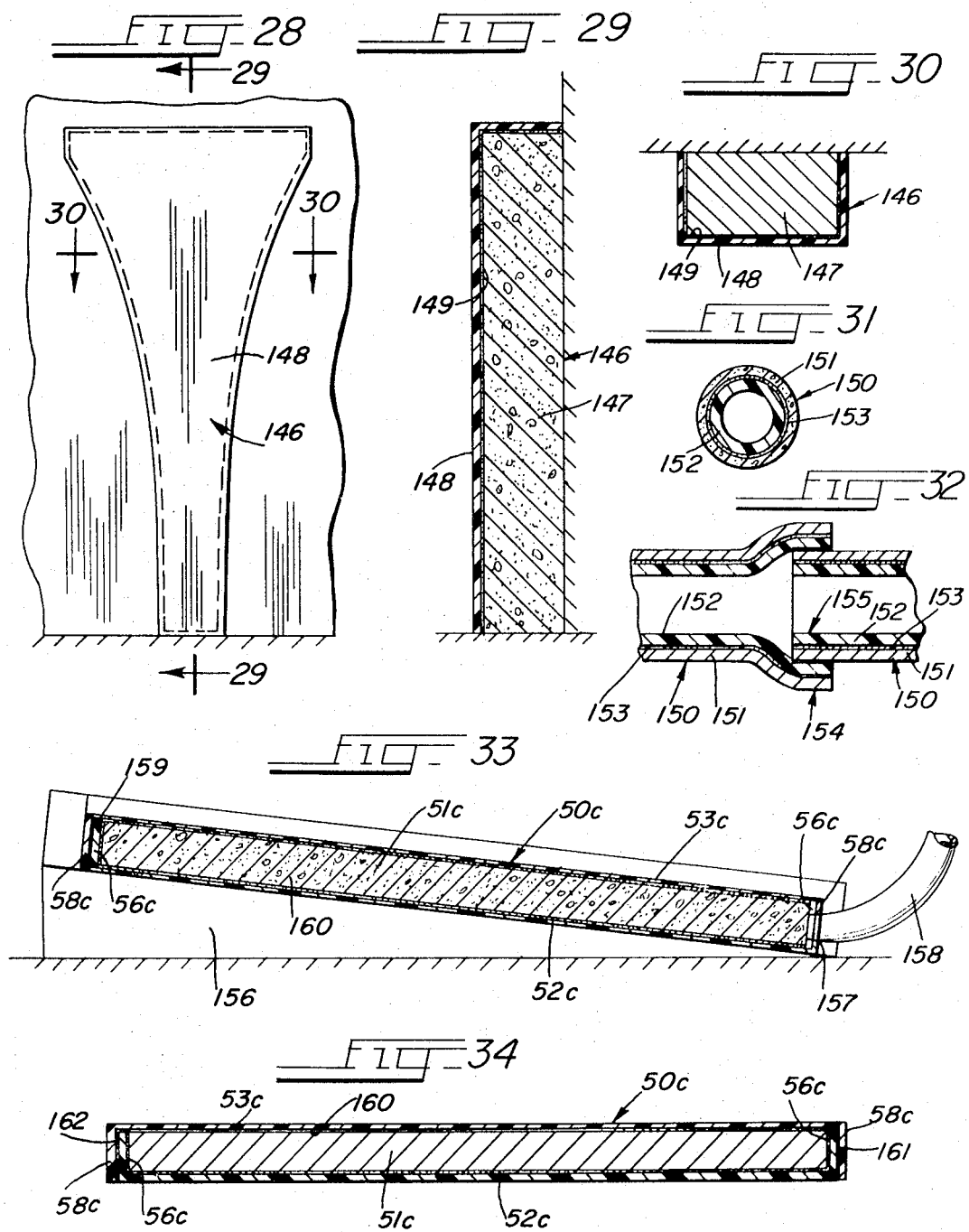

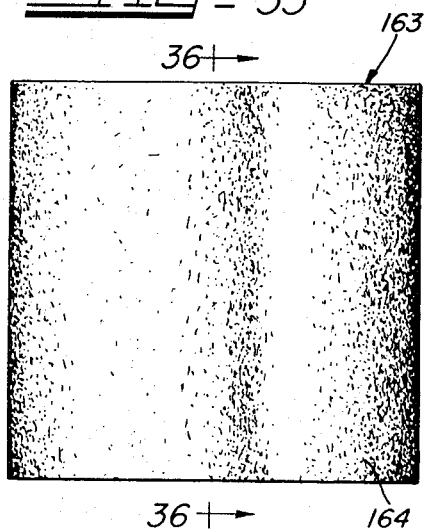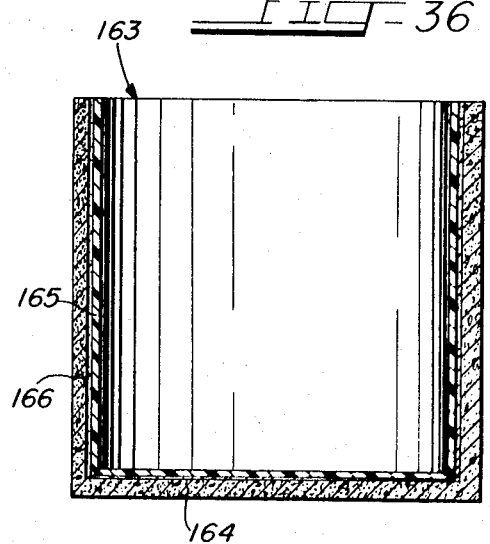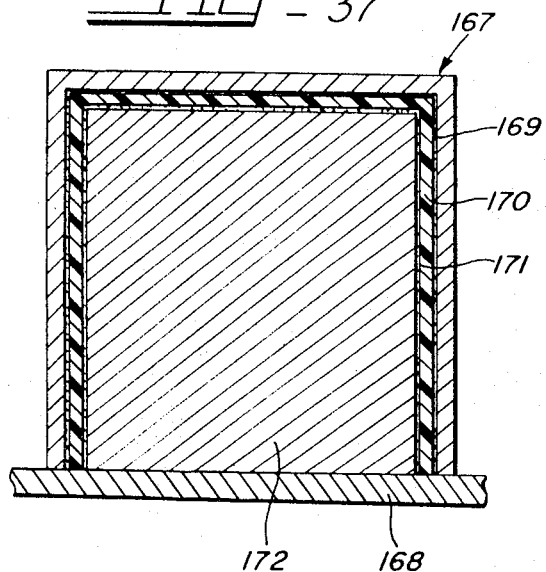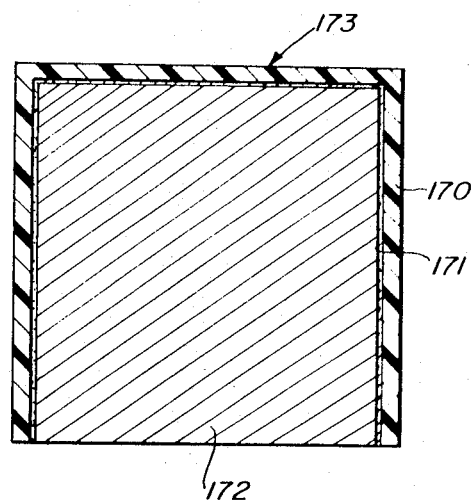

3,619,457

METHOD OF FORMING STRUCTURAL UNITS

This is a division of application Ser. No. 625,244 filed Mar. 22, 1967 and entitled STRUCTURAL UNITS AND METHOD OF FORMING THE SAME, now abandoned.

GENERAL

While concrete is a basic construction material and is extensively used, partly because of its relatively economical character, it has certain disadvantages when used in or as structural units for building and construction purposes, and when used in making other articles and products with which the present invention is concerned, and which are referred to herein, and among such disadvantages of concrete are the following: (1) while concrete has good compressive strength characteristics it is weak or low in tensile strength and hence its use is limited to structural applications in which compressive strength only is required and where tensile strength is not an important consideration, or where other means, such as steel reinforcing or prestressing of the concrete, is employed to improve and enhance its tensile strength; (2) concrete tends to deteriorate in many climates due to cyclical freezing and thawing; (3) concrete tends to deteriorate in contact with acids, many industrial fumes and many chemicals and chemical solutions; and (4) concrete is not an attractive building or structural material and in applications in which decorative appearance is an important factor it must be treated or coated or otherwise provided with a decorative finish.

OBJECTS

An object of the present invention is, therefore, to provide new and improved structural units which comprise a molded or otherwise formed plastic resinous component providing at least a portion of the mold surface for a second component; a second component of concrete, molding plaster or like material formed against the mold surface of the resin component; and an adhesive bonding agent between the mold surface of the resin component and the second component formed thereon and cured in situ with the second component and adhesively bonding the resin component and the second component together to form the said structural units, which, while possessing all of the desirable characteristics of concrete, including high compressive strength, relative economy and other desirable characteristics, is free from the objectionable qualities of deficiencies of concrete including its low tensile strength, tendency to deteriorate under cyclical freezing and thawing, and lack of attractive appearance.

A further object of the present invention is to provide new and improved articles and products made from the new and improved structural units referred to in the object set forth above.

Another object of the present invention is to provide a new and improved method of making the new structural units.

DESCRIPTION OF FIGURES

FIG. 1 is a perspective schematic view of a prefabricated building embodying one form of the new structural building units;

FIG. 2 is a sectional view of one form of the new structural units in the form of a wall panel, such as used in the structure of FIG. 1;

FIG. 3 is an enlarged fragmentary cross-sectional view on line 3—3 of FIG. 2;

FIG. 4 is a sectional view of a modification of the form of the invention shown in FIGS. 2 and 3;

FIG. 5 is an enlarged fragmentary longitudinal sectional detail view on line 5—5 in FIG. 4;

FIG. 6 is an enlarged fragmentary transverse sectional detail view on line 6—6 of FIG. 4;

FIG. 7 is a fragmentary sectional detail view of a modification of the invention, similar to that shown in FIG. 6, but embodying a metal component in place of the resin component;

FIG. 8 is an enlarged fragmentary detail view of another modification of the invention, similar to that shown in FIGS. 6 and 7, but embodying a concrete component, a resin component, and a metal component;

FIG. 9 is a longitudinal sectional view of another form of the invention, similar to that shown in FIGS. 4, 5 and 6, but having reinforcing members embedded in the concrete component;

FIG. 10 is another modification of the invention, similar to that shown in FIGS. 4, 5 and 6, but embodying prestressed concrete in and as the concrete component;

FIG. 11 is a perspective view of a wall structure embodying a structural building wall panel unit similar to that shown in FIGS. 4, 5 and 6, but in a different form or shape and embodying a tongue and groove or mortise and tenon type of joint for interconnecting the individual wall panel units;

FIG. 12 is an enlarged fragmentary longitudinal sectional detail view on line 12—12 in FIG. 11;

FIG. 13 is an enlarged fragmentary longitudinal sectional detail view on line 13—13 of FIG. 11;

FIG. 14 is an enlarged fragmentary transverse sectional view on line 14—14 of FIG. 11;

FIG. 15 is a perspective view illustrating another form of the invention similar to that shown in FIGS. 4, 5 and 6, but embodying a different type of connection for interconnecting the structural building wall panel units;

FIG. 16 is an enlarged fragmentary transverse sectional view on line 16-16 in FIG. 15;

FIG. 17 is an enlarged sectional detail view of the area indicated at "FIG. 17" in FIG. 16;

FIG. 18 is a fragmentary sectional detail view of a further modification of the invention, similar to that shown is FIG. 2, but embodying a molded plastic resinous component having a serrated formation;

FIG. 19 is a fragmentary sectional view of another modification of the invention, which is similar to that shown in FIGS. 2 and 3 and in FIG. 18, but in which the plastic resinous component has a notched surface;

FIG. 20 is a vertical sectional view of another modification of the invention in which the concrete component is in the form of a concrete building block;

FIG. 21 is a fragmentary view of another modification of the invention in the form of a decorative wall panel unit;

FIG. 22 is an enlarged fragmentary sectional view on line 22—22 of FIG. 21;

FIG. 23 is a fragmentary plan view of another form of the invention, in the form of a decorative wall panel unit, similar to that shown in FIGS. 21 and 22;

FIG. 24 is an enlarged fragmentary sectional view on line 24—24 of FIG. 23;

FIG. 25 is a fragmentary perspective view of another form of the invention, similar to that shown in FIGS. 2 and 3, but in the form of wall tile unit;

FIG. 26 is an enlarged fragmentary sectional detail view on line 26—26 in FIG. 25;

FIG. 27 is a fragmentary sectional view of another modification of the invention, similar to that shown in FIGS. 2 and 3, but in the form of a counter top or like panel unit;

FIG. 28 is an elevational view of another modification of the invention, employing a building panel unit similar to that shown in FIGS. 2 and 3, in the form of a building column unit;

FIG. 29 is a vertical longitudinal sectional view on line 29—29 of FIG. 28;

FIG. 30 is a transverse sectional view on line 30—30 in FIG. 28;

FIG. 31 is a transverse sectional view of another form of the invention in the form of a pipe unit;

FIG. 32 is a sectional view showing two of the pipe units shown in FIG. 31 joined together;

FIG. 33 is a longitudinal sectional view illustrating one method which may be sued in the practice of the present invention for forming one of the new structural units, such as shown in FIGS. 4, 5, 6 and 34;

FIG. 34 is a longitudinal sectional view of a structural unit of the present invention as made in accordance with the practice of the method illustrated in FIG. 33;

FIG. 35 is an elevational view of another article or product which may be made in accordance with the practice of the present invention, namely, a septic tank or chemical tank;

FIG. 36 is a central vertical sectional view on line 36—36 in FIG. 35;

FIG. 37 is a vertical sectional view illustrating another method which may be employed in making articles or products in the practice of the present invention; and FIG. 38 is a vertical sectional view illustrating an article or product made in accordance with the method illustrated in FIG. 37.

SUMMARY OF METHOD

In the practice of the present invention, and in the manufacture of the new structural units of the present invention, and articles and products made therefrom, the following general steps are employed:

1. A molded plastic resinous sheet unit may be employed as a mold or, alternatively, one or more coats of plastic resinous material may be applied, in any suitable manner, as by spray coating, brushing or the like, against a suitable mold surface such as indicated in FIG. 37 of the drawings;

2. A strong adhesive bonding coating, such as an epoxy resin based coating is then applied in any suitable manner, as by spray coating, brushing, or the like, over one or more surfaces of the molded plastic resinous sheet unit or over the surface of the plastic resinous coatings which have been applied against a mold surface;

3. Portland cement concrete mix, lightweight aggregate concrete mix, so-called industrial molding or tooling plaster, or like material, may then be poured into or onto the mold in contact with the adhesive bonding coating which has been applied to the molded plastic resinous sheet unit or to the resinous surface coating or coatings, and as the Portland cement concrete mix, lightweight concrete aggregate mix, or molding plaster cures and hardens the adhesive bonding coating also cures and hardens with the result that the molded plastic resinous sheet unit or the plastic resinous coating unit and the adhesive bonding coating cure and harden simultaneously and thus are integrally and permanently bonded together to form a structural component of the present invention having the desirable advantages and characteristics of concrete including high compressive strength, relative economy of manufacture, while at the same time, being free of the objectionable qualities and characteristics of concrete and possessing high tensile strength and attractive appearance.

DETAILED DESCRIPTION

A preferred and typical embodiment of the structural building panel of the present invention is illustrated in FIGS. 1, 2 and 3 of the drawings, wherein it is generally indicated at 40, and is shown as embodying structural building wall panels including sidewall panels 41 and 42, end wall panels 43, a floor unit 44, and a roof unit 45. In this form of the invention, each of the sidewall panels 41 and 42, and the end wall panels 43, may embody the building panel construction shown in FIGS. 2 and 3, and which is generally indicated at 46, and which comprises a concrete slab component 47 having a molded or otherwise formed plastic resinous outer liner component 48 integrally bonded thereto by means of a strong adhesive bonding agent such, for example, as an epoxy based resin 49.

A modification of the new structural building panel unit of the present invention is illustrated in FIGS. 4, 5 and 6 of the drawings wherein it is generally indicated at 50. This form of the structural building panel unit 50 is similar to that shown in FIGS. 2 and 3, but differs therefrom in that the structural building panel unit 50 which is embodied in this form of the invention comprises an inner concrete slab or liner component 51 having a resin component which includes outer walls or liners 52 and 53, respectively, which may be made of suitable molded or otherwise formed synthetic plastic resinous material such, for example, as molded high impact polystyrene resin, or acrylonitrile-butadiene-styrene copolymer resin, or the like, which are integrally bonded to the concrete component 51 by a suitable adhesive bonding agent such, for example, as epoxy resin based coatings 54 and 55, respectively.

The new structural building panel unit 50, shown in FIGS. 4, 5 and 6, also includes inner end walls 56 which are integral with the inner plastic resinous wall 52, and are adhesively bonded to the concrete inner liner component 51 by an epoxy based resin or like adhesive bonding coating 57. The other plastic resinous wall or liner 53 includes outer end walls 58 which overlap the inner end walls 56 and are adhesively bonded to the latter by means of an epoxy based resin or like adhesive bonding coatings 59 (FIG. 5).

Another modification of the invention is illustrated in FIG. 7 of the drawings, wherein it is generally indicated at 60, and comprises an inner concrete liner component 61 and a metal structural component which includes metal liners 62 and 63, respectively, which may be made of steel, aluminum, copper, or other metal and which are arranged on opposite sides of the inner concrete component 61 and are integrally bonded thereto by an epoxy based resin adhesive coatings 64 and 65, respectively, or the like.

Another form of the new structural building panel unit is shown in FIG. 8 of the drawings, wherein it is generally indicated at 66, and is similar to the form of the invention shown in FIG. 7, but comprises a concrete inner liner component 67 and a composite resin-metal component which includes a metal wall or liner 68, such as steel, aluminum, copper, or the like, which is integrally bonded to the concrete component 67 by means of an epoxy based resin or like adhesive bonding coating 69. The composite resin-metal component also includes a molded or otherwise formed high impact polystyrene or other suitable synthetic plastic resinous liner 70 which is adhesively bonded to the outer surface of the concrete liner component 67 by means of an epoxy based resin or like strong adhesive bonding coating 71.

Another modification of the structural building panel unit of the present invention is illustrated in FIG. 9 of the drawings, wherein it is generally indicated at 72. This form of the invention is similar to the form of the invention shown in FIGS. 4, 5 and 6 and those parts thereof which are similar or comparable to corresponding parts in the form of the invention illustrated in FIGS. 4, 5 and 6 have been given similar reference numerals followed by the additional and distinguishing reference character "a." Thus, the form of the invention illustrated in FIG. 9 differs from that shown in FIGS. 4, 5 and 6 in that in this form of the invention the concrete inner liner component 50a has a reinforcing means 73 embedded therein.

Another modification of the invention is illustrated in FIG. 10 of the drawings, wherein it is generally indicated at 74. This form of the invention is similar to that shown in FIGS. 4, 5 and 6, and those parts thereof which are similar or comparable to corresponding parts in the form of the invention illustrated in FIGS. 4, 5 and 6, have been given similar reference numerals followed by the additional and distinguishing reference character "b." Thus, the form of the invention illustrated in FIG. 10 differs from that shown in FIGS. 4, 5 and 6 in that in this form of the invention the concrete inner liner component 51b is formed of prestressed concrete having reinforcing means 75 embedded therein.

Another modification of the invention is illustrated in FIGS. 11 to 14, inclusive, of the drawings, wherein it is generally indicated at 76, and comprises vertically and horizontally arranged rows or tiers of interconnected individual structural building panel units 77 which are joined at their meeting vertical surfaces by mortar or like masonry joints 78, and are joined at their horizontal surfaces by tongue and groove or mortise and tenon joints which will be described hereinafter. Thus, each of the individual structural building wall panel units 77 embodies a concrete inner base component 79, and molded or otherwise formed synthetic plastic resinous component, in the form of inner and outer sidewall liners 80 and 81, respectively, which are adhesively bonded to the concrete inner base component 79 by means of an epoxy based or like strong adhesive bonding coatings 82 and 83, respectively.

In addition, each of the structural building panel units 77 includes inner and outer end walls 84 and 85, respectively, which are formed as integral parts or extensions of the inner and outer sidewall liners 80 and 81, respectively, and are similarly adhesively bonded to the concrete inner base component 79.

The concrete inner base component 79 of each of the individual structural building panel units 77 includes an upper centrally arranged latching tongue portion 86 and the plastic resinous inner end wall 84 has a correspondingly shaped integral latching tongue portion 87 which overlies the latching tongue 86 and is adhesively bonded thereto by means of an epoxy based or like strong adhesive bonding coating 88. Similarly, the end wall 85 has an integral tongue-shaped latching portion 89 which overlies the tongue-shaped latching portion 87 of the end wall 84 and the tongue-shaped latching portions 88 and 89 are adhesively bonded together by means of an epoxy based or like strong adhesive bonding coating 90.

The concrete inner base component 79 of each individual structural building panel unit 77 has a latching recess or groove 91 formed therein and the sidewall 81 has an integral portion 92 which is shaped to extend into and fits into the recess or groove 91 and is adhesively bonded therein to the concrete inner base component 79 by means of an epoxy based or like strong adhesive bonding coating 93. Similarly, the sidewall 80 has an integral portion 94 which is shaped to and extends into and fits into the portion 92 of the sidewall 81 and is adhesively bonded to the portion 92 of the sidewall 81 by means of epoxy based or like strong adhesive bonding coating 95 (FIG. 12).

It will thus be seen that the tongue-shaped portions 87 and 90 of the resinous end wall liners 84 and 85 respectively, cooperate with the tongue-shaped latching portion 86 of the concrete inner base component 79 to form a connecting or latching tongue 96 on each of the structural building panel units 77 and that the recess or groove 91 in concrete inner base component 79 cooperates with the correspondingly shaped portions 92 and 94 of the sidewalls 81 and 80 respectively, to form a connecting latching recess or groove 97 for the reception of the corresponding latching tongue 96 of the individual structural building panel unit 77 therebelow (FIG. 11). In this manner, the individual structural building panel units 77 are interconnected by the tongue and groove or mortise and tenon joints 96 and 97, and they may be joined together at their meeting sidewall bases by the mortar or like masonry joints 78.

Typical examples of suitable synthetic plastic resinous materials which may be used in making the resinous component of the structural building units disclosed in FIGS. 11 to 14, inclusive, are acrylonitrile-butadiene-styrene copolymers, ROYALITE resin (U.S. Rubber Co.), CYCOLAC resin (Marbon Chemical Co.), acrylic resins, such as methyl methacrylate, polyvinyl chloride, acrylic and vinyl resin blends such as KYDEX (Rohm and Haas Co.), and others.

Another form of the invention is illustrated in FIGS. 15, 16 and 17 of the drawings, and comprises a building wall structure generally indicated at 98, and which includes individual wall panel units 99 each of which embodies a concrete inner component 100 end a molded or otherwise formed polystyrene or like resin component which is comprised of spaced resinous wall panels 101 and 102 which integrally bonded to the concrete component 100 by means of an epoxy based resin or like strong adhesive bonding coating 103.

The concrete inner component 100 has a recess or groove 104 formed therein and the sidewall or liner 101 has an indented end wall portion 105 which is adapted to fit into and extends into the groove or recess 104 and is adhesively bonded to the concrete component 100 at the inner surface of the recess or groove 104 by means of a continuation of the epoxy based resin or like adhesive bonding coating 103. Similarly, the other plastic resinous wall or liner 102 has an indented portion 106 which is shaped to fit into and extends into and matches the indented end wall portion 105 of the plastic resinous wall or liner 101 and is adhesively bonded, as aforesaid, to the indented end wall portion 105 of the resinous wall or liner 101.

Hence, it will be seen that the groove or recess 104 in the concrete component 100 and the end wall portions 105 and 106 of the plastic resinous walls or liners 101 and 102, respectively, cooperate to form a latching groove or recess 107 in each building panel unit 99 for reception of a correspondingly shaped connecting or latching tongue portion 108 which is formed on the opposite end of each individual building panel unit 99 in the same manner as that in which the connecting or latching tongue 96 is formed on each of the individual panel units 77 in the form of the invention illustrated in FIGS. 11 to 14, inclusive.

Hence, it will be seen that in the use of the new wall panel units 99, shown in FIGS. 15, 16 and 17, they may be interconnected by fitting the connecting or latching tongue portion 108 of one panel 99 into the connecting latching recess or groove 107 in the next adjacent panel 99 and securing the latching tongues 108 in the latching recesses or grooves 107 by means of an adhesive, or by means of a press or friction fit, or the like.

A further modification of the new structural panel unit of the present invention is illustrated in FIG. 18 of the drawings, wherein it is generally indicated at 109, and comprises a resin component 112 having a serrated or notched surface 111 in the form of a molded or otherwise formed acrylonitrile-butadiene-styrene copolymer or like plastic resinous liner component 112 to which is applied an epoxy based resin or the like adhesive bonding coating 113 and against which is poured a concrete component 110 which takes the shape of the resin component 112, and the concrete component 110 and the adhesive bonding coating 113 cure simultaneously.

An additional modification of the new structural building panel unit of the present invention is illustrated in FIG. 19 of a resin component having a notched surface 116, the resin component being in the form of a molded or otherwise formed plastic acrylonitrile-butadiene-styrene or like plastic resinous liner 117 to which is applied an adhesive bond coating 118 and against which is poured a concrete component 115 which takes the shape of the resin component, and the concrete component and the adhesive bonding coating subsequently cure simultaneously.

A further modification of the new structural building units of the present invention is illustrated in FIG. 20 of the drawings, wherein it is generally indicated at 119, and comprises a plurality of individual structural building units 120 each of which includes a concrete block component 121 and molded or otherwise formed polystyrene or like plastic resinous other liner components 122, each of which has an inwardly extending marginal flange portion 123. The plastic resinous liners 122 are attached marginal flange portions 123 are adhesively joined to the adjacent surfaces of the concrete block component 121 by means of an epoxy based or like resin bonding coating 124. The adjacent or meeting surfaces of the concrete inner block components 121 may be joined together by means of a mortar or like masonry joint 125 (FIG. 20).

It will be noted that in making the new structural unit 119 in the form of the invention shown in FIG. 20, the outer resinous wall liners 122 may be assembled together in any suitable manner to provide the mold form for the inner concrete block component 121 which may be formed therein.

An additional modification of the invention is illustrated in FIGS. 21 and 22 of the drawings, wherein it is generally indicated at 126 and is shown as being in the form of a series of individual decorative wall panel units 127 each of which is comprised of a concrete slab or base component 128 in the outer surface of which decorative ceramic particles 129 may be embedded. Each of the decorative wall panel units 127 also includes a resinous component in the form of a boxlike receptacle 130 for the concrete component 128. The boxlike resin receptacle component 130 may be molded or otherwise formed of polystyrene or like plastic resinous material and includes upright side and end walls 131 which are adhesively bonded to the adjacent surfaces of the concrete component 128 by means of an epoxy based or like resinous bonding coating 132.

A further modification of the invention is illustrated in FIGS. 23 and 24 of the drawings, wherein it is generally indicated at 133 and is shown as having the form of a continuous wall covering which embodies a concrete inner base component 134 on the upper surface of which an epoxy based or like resin coating 135 is provided and if desired, ceramic or like decorative particles 136 may be embedded in the adhesive resin coating 135. The resinous component of each of the wall panels 133 includes a molded or otherwise formed polystyrene or like plastic resinous boxlike outer liner 136 which is integrally bonded to the adjacent surfaces of the concrete base component 134 by means of epoxy based or like adhesive bonding coating 137 (FIG. 24).

A further modification of the invention is illustrated in FIGS. 25 and 26 of the drawings, wherein it is generally indicated at 138, and is shown as being in the form of a decorative wall tile unit which includes a concrete base component 139 and a plastic resinous component in the form of a plurality of molded plastic resinous decorative wall tile panels 140 each of which is adhesively bonded to the concrete base component 139 by means of an adhesive bonding coating 141 of an epoxy based resin or the like.

In the use of the form of the invention shown in FIGS. 25 and 26 of the drawings, any desired number of the plastic resinous tile panels 141 may be mounted on the concrete base component 139, which may be of any desired size and shape, and the complete wall tile assembly 138 may be mounted in position of use, as shown in FIG. 25.

A further modification of the invention is illustrated in FIG. 27 of the drawings, wherein it is generally indicated at 142, and is shown as having the form of a counter top panel unit which includes a concrete base component 143 and a resinous component in the form of a molded or otherwise formed plastic resinous panel 144 which may be made of a sheet or panel of molded thermosetting phenolic resin such, for example, as FORMICA brand of molded phenolic resin sheet material, which is adhesively bonded to the concrete base component 143 by means of an epoxy based resin or like adhesive bonding coating 145. This embodiment of the invention is particularly adapted for use as and for counter tops, laboratory table tops, and the like.

In making the new structural units in the form of the decorative wall tile units 138 of FIGS. 25 and 26, the molded resinous tile component members 140 may be assembled together in any suitable manner to provide the desired mold surface for the concrete base component 137, and in the form of the invention illustrated in FIG. 27, the molded resinous liner component 144 may be used to provide the mold surface for the concrete base component 143.

An additional modification of the invention is illustrated in FIGS. 28 to 30, inclusive, of the drawings, as is shown as having the form of a structural building unit in the form of a building column or beam 146, which embodies a concrete base component 147 and a molded or otherwise formed boxlike synthetic plastic resinous component 148, which may be an acrylonitrile-butadiene-styrene copolymer resin, or other suitable resin, which is adhesively bonded to the concrete base component 147 by an epoxy based resin or like strong adhesive bonding agent coating 149.

In the practice of the present invention, it has been found that the structural building unit column or beam 146, as illustrated in FIGS. 28 to 30, inclusive, of the drawings, has superior structural and tensile strength as compared to conventional concrete structural building column and beam units. Thus, tests on structural building beam units embodying the form of the invention illustrated in FIGS. 28 and 30, inclusive, of the drawings, show the superior structural and tensile strength characteristics thereof, as compared to comparable conventional concrete structural building beam units, and the results of such tests are shown in and by the following examples and tables:

EXAMPLE 1

Two specimens were prepared to compare the structural properties of structural units or components embodying the present invention with comparable conventional concrete units. The specimen embodying the present invention was prepared by making an inner and an outer boxlike surface liner component by vacuum-forming a synthetic plastic polystyrene resin (Styron 453) (Dow Chemical Company), in the form shown in FIGS. 4, 5 and 6 of the drawings; applying an epoxy based resin to the inner surfaces thereof; placing the box-shaped resin component in a holding fixture; and then filling the cavity of the box-shaped resin component with a Portland cement concrete mix. A second and control boxlike resin component was prepared in exactly the same manner except that no adhesive was applied to the inner surfaces of the boxlike resin component. The two test specimens or units were then allowed to cure for 28 days, after which 2"×10" test beam specimens were cut out of the sides and bottom of the test units. These test beam specimens were then supported with an 8 inch clear span and loaded by center-point loading. Break point loads were recorded on the specimens and modulus of rupture calculations were made, and the results were as follows:

TABLE 1

| Description of specimen | Location from which taken | Number of specimens tested | Average thickness of specimen, inches | Average modulus of rupture, p.s.i. | Relative percentage of gain in strength [1] |
|---|---|---|---|---|---|
| Control [2] | Bottom of specimen | 5 | .827 | 799 | |
| Control [2] | Side of specimen | 5 | .793 | 719 | |
| Present invention | Bottom of specimen | 5 | .812 | 1,288 | 61 |
| Do | Side of specimen | 5 | .812 | 1,172 | 63 |

[1] Of present invention over conventional concrete.
[2] Conventional concrete.

EXAMPLE 2

Two test slab specimens were prepared from the same batch of Portland cement concrete mix, as was used in preparing the specimens according to the foregoing example No. 1. The control specimen was composed only of Portland cement concrete mix (2 ¼ inch) thick and the specimen embodying a structural unit of the present invention was prepared as follows:

1. A pouring form was first coated with a suitable parting agent or coating;
2. A coating of glass fiber-reinforced epoxy resin (woven glass fiber saturated with RESIWELD epoxy resin based adhesive No. 7004, H. B. Fuller Company, St. Paul, Minn.) was applied in the form of several coatings over the parting agent coating on the form by the wet-lay-up method, (as illustrated, for example, in FIG. 37 of the drawings), to a total thickness of 5/32 inch:

3. While the glass fiber-reinforced epoxy resin based adhesive coating was still wet to the touch, a Portland cement concrete mix was applied thereto and the concrete mix screeded off until the composite thickness of the glass fiber-reinforced coating and the concrete mix adhered thereto had the same thickness (2 ¼ inch) as the control concrete slab specimen; and 4. After the two specimens had been allowed to cure and harden for 28 days, test beam samples or specimens 3 inches wide, 10 inches long, and 2 ¼ inches thick were cut therefrom and then simply supported with an 8-inch inch clear span, and loaded by center point loading. The test beam specimen or sample of the present invention was tested with the glass fiber-reinforced epoxy resin based adhesive on tension side. Break point loads were recorded, and modulus of rupture calculations were made and the results were as follows:

TABLE 2

| Description of specimen | Number of specimens tested | Average thickness of specimen, inches | Average modulus of rupture, p.s.i. | Relative percentage of gain in strength [1] |
|---|---|---|---|---|
| Control [2] | 3 | 2¼ | 619 | |
| Present invention | 3 | 2¼ | 2,678 | 333 |

[1] Of present invention over conventional concrete.
[2] Conventional concrete.

Another modification of the invention is illustrated in FIGS. 31 and 32 of the drawings, and is shown as having the form of a pipe unit 150, such as may be used, for example, as sewer pipes, water pipes, and the like, and embodies a tubular and generally cylindrical concrete outer pipe component 151 having a molded synthetic plastic polyvinyl chloride or like tubular resinous inner liner component 152 which is adhesively bonded to the outer concrete pipe component 151 by means of an epoxy based or like resin bonding coating 153.

Each of the new pipe units 150 has an enlarged annular coupling flange portion 154 at one end thereof which is adapted to receive an end portion 155 of another pipe unit 150 so that the new pipe units 150 may be joined together telescopically in the manner illustrated in FIG. 32 of the drawings. When used as a sewer pipe, or water pipe, or the like, the new pipe unit 150 has superior resistance to corrosion due to soil, acids, and components of the liquid or other materials flowing therethrough, while, at the same time, having improved structural and tensile strength characteristics relative to comparable conventional concrete sewer and water pipes, and the like.

In the form of the invention illustrated in FIGS. 31 and 32, the molded resinous inner pipe liners component 152 may be used to provide the mold surface for forming the outer concrete pipe component 151 and similar procedures may be followed in making other forms of the new structural units.

A typical application of one method which may be used in making the new structural units of the present invention, and such as are illustrated, for example, in FIGS. 4, 5, 6 and 32 of the drawings, is generally illustrated in FIGS. 33 and 34 of the drawings, wherein it is generally indicated at 50c, and is similar to that illustrated in FIGS. 4, 5 and 6; those parts thereof which are similar to corresponding parts of the structural units shown in FIGS. 4, 5 and 6 being given similar reference numerals followed by the additional and distinguishing reference character "c." Thus, it will be noted that the preformed or molded resinous inner and outer wall members or liners 52c and 53c, respectively, and their marginal side and end walls, as 56c and 58c, respectively, cooperate to form the resinous outer component 52c–53c–56c–58c of the new structural building unit 50c and that the resinous outer component 52c–53bh–56c–58c forms a mold, the interior surface of which provides a mold surface against which the inner concrete component 51c may be formed, as will be explained presently.

Thus, in the practice of the present invention, and in the use of the method illustrated in FIGS. 33 and 34 of the drawings, the resinous outer component 52c–53c–56c–58c may be supported on a suitable mold support 56 (FIG. 33) in an inclined position relative to the horizontal, and a filler opening 157 may be formed in any suitable manner in the lower end walls 56c–58 of the mold which is provided by the outer resinous component 52c–53c–56c–58c for the reception of an end portion of a flexible hose 158. A vent opening 159 may be formed in any suitable manner in the upper end portions of the upper end walls 56c–58c of the combination resin component and mold 56c–53c–56c–58c.

In the practice of the form of the invention illustrated in FIGS. 33 and 34, a coating of epoxy based resin, or like strong adhesive bonding agent 160 is provided over the entire interior surface of the mold provided by the outer resinous wall members or liners 52c–53c–56c–58c prior to the time the same are assembled into the form of a mold, as in FIG. 33, whereupon the end portion of the flexible hose 158 may be introduced into the filler opening 157 and a wet Portland cement concrete mix pumped into the mold cavity formed by the outer plastic resinous walls or liners 52c–53c–56c–58c while the epoxy based resin or like adhesive bonding coating 160 on the inner surfaces of the resinous component-mold form 52c–53bh–56c–58c is in a wet condition. During this concrete pumping operation air is vented from the interior of the mold cavity formed by the molded resinous outer walls or liners 52c–53bh–56c–58c through the vent opening 159 and after the concrete filling operation has been completed, the hose 158 is removed and the filler opening 157 is filled with a plug 161 of suitable plastic resinous or other sealing material, and the vent opening 159 is similarly filled with a sealing plug 162 (FIG. 34). The plastic resinous component-mold 52c–53c–56c–58c with the wet concrete mix therein, may be then removed from the mold support 156 and the concrete mix allowed to set and cure for a desired length of time, such as 28 days, and as the concrete mix sets and cures the epoxy resin adhesive coating 160 also sets and cures with the result that the molded plastic resinous outer walls or liners 52c–53c–56c–58c are thus integrally bonded to the inner concrete component 51c to provide the complete structural building panel unit 50c, as shown in FIG. 34.

It will thus be noted that in the practice of the form of the invention illustrated in FIGS. 33 and 34 of the drawings, the molded plastic resinous component 52c–53c–56c–58c serves as the mold for forming the concrete component 51c, and that no additional mold form is required for forming the concrete component 51c.

Another form of the invention is illustrated in FIGS. 35 and 36 of the drawings, wherein it is generally indicated at 163, and is shown as having the form of a septic tank, chemical storage tank, or the like, and comprises a concrete outer component 164 and a molded or otherwise formed polyvinyl chloride resin, or like resin which is resistant to the corrosive action of chemicals and like materials, and which is integrally bonded to the concrete outer component 164 by an epoxy bond or like strong adhesive bonding agent coating 166.

Resinous materials which may be employed in the practice of the present invention, as and for the precast molded plastic resinous components of the new structural units, and for use in making the new structural units in accordance with the method illustrated in FIGS. 33 and 34 of the drawings, are the following:

1. acrylonitrile-butadiene-styrene copolymer resins;
2. acrylic resins, such as methyl methacrylate;
3. polyvinyl chloride;
4. acrylic-vinyl resin blends;
5. polystyrene resins;
6. glass fiber-reinforced epoxy resins;
7. glass fiber-reinforced polyester resins; and
8. other suitable thermoplastic resins which possess the desirable characteristics of the resins used in the practice of the present invention, including resistance to the action of sunlight, chemicals and heat, while also possessing high structural and tensile strength characteristics.

The plastic resinous components of the new structural units may be formed by molding resins by means of vacuum molding, in the case of relatively large resinous components, or by injection molding in the case of relatively smaller resinous components, or otherwise precasting or premolding them by a molding machine operation. However, the plastic resinous components of certain of the new structural units may also be formed by the so-called wet lay-up method, as by means of spraying, brushing, or the like, as illustrated in FIGS. 37 and 38 of the drawings and as will now be described.

Thus in making the plastic resinous components of the new structural units by the so-called wet lay-up method, a suitable hollow mold form 167 of desired shape and size, etc., (FIG. 37) may be employed and supported upon a supporting base 168. A parting agent coating 169 may be applied to the interior surface or mold cavity of the mold form 167, whereupon the plastic resinous component 170 may be formed by applying successive coatings of a suitable resinous material, such as are described hereinafter, over the parting agent coating 169. A coating of epoxy based resin, or like adhesive bonding agent coating 171, is then applied over the entire inner surface of the plastic resinous coatings (either before or after the plastic resinous coatings have set and cured), and the concrete component 172 is then formed by suitably placing a concrete mix against the epoxy resin coated inner surface of the plastic resinous component 170 while the epoxy resin coating is still in a wet condition. Hence, as the concrete mix sets and cures the epoxy resin coating 171 also sets and cures with the result that the thus formed concrete component is integrally bonded by the epoxy resin bonding coating 171 to the resinous component 170, whereupon the structural unit 172 (FIG. 38) may be removed from the mold form 167.

In some instances industrial molding or tooling plaster may be substituted for the concrete mix in making articles or products in the practice of the present invention, either by the method illustrated in FIGS. 33 and 34 or by the method illustrated in FIGS. 37 and 38 of the drawings.

Suitable resinous materials which may be employed in making the resinous components of the new structural units and articles and products of the present invention, by the method illustrated in FIGS. 37 and 38 of the drawings, are the following:

1. acrylic lacquers;
2. polyvinyl chloride lacquers or coatings;
3. thermosetting epoxy resin coatings;
4. thermosetting polyester resin coatings; and
5. thermosetting polyurethane resin coatings.

Typical examples of epoxy resin adhesive bonding agents which may be used in the practice of the present invention for bonding the resin components to the metal components or to the concrete components, or to the molding plaster components, are the following:

1. Epoxy resin based adhesives, which are particularly effective for bonding wet Portland cement concrete mix to itself and to resinous and metal surfaces;
2. RESIWELD brand adhesive No. 7006 (H. B. Fuller Company, St. Paul, Minn.) which is an epoxy resin based adhesive which is particularly effective for use in bonding preformed or molded polyvinyl chloride resin sheets to wet or poured-in-place concrete;
3. RESIWELD brand adhesive No. R-7006-F (H. B. Fuller Company, St. Paul, Minn.) which is an epoxy resin based adhesive and which is particularly effective for bonding polystyrene sheet resin to wet or poured-in-place concrete;
4. RESIWELD brand adhesive No. R-7680 (H. B. Fuller Company, St. Paul, Minn.) which is an epoxy resin based adhesive which is particularly effective for bonding epoxy resin sheets and polyester resin sheets to wet or poured-in-place concrete; and
5. Where a lower strength adhesive bonding coating is suitable, butadiene-styrene copolymer latex or polyvinyl acetate latex are effective for bonding certain resinous materials to wet Portland cement concrete.

Additional advantages of the method of the present invention for forming the new structural units, and articles and products made therefrom in addition to the advantages pointed out above, are the following:

1. When a Portland cement concrete mix made with normal aggregates or with lightweight aggregates is poured against a mold surface coated with an oil or like parting agent, the oily parting agent tends to remain on the surface of the molded concrete article or product, with the result that it is difficult to apply certain types of finish coats thereto;
2. Concrete has a tendency to form a powdery so-called laitance on its outer surface and in many instances this powdery laitance tends to impede the adhesion of a surface or finish coat to the concrete with the result that this powdery laitance must be removed before a suitable bond can be obtained between the concrete and the finish coat;
3. When concrete is cast against a mold it tends to form surface voids, air bubbles, and similar defects which are frequently objectionable in the resulting article or product, and if a finish coat is applied over such surface defects in the concrete article or product the finish coat has to bridge such surface defects in order to provide a continuous film with the result that a smooth attractive finish on the concrete is difficult to obtain without applying an excessively thick coating film;
4. In the case of preformed molded thermoplastic resin sheets used in making structural components or units of the present invention, and which may be vacuum-formed into the desired shape, any desired texture or ornamental design can be placed on the external surface thereof by means of embossing rolls, and in the case of preformed thermosetting resin surfaces any desired texture or finish can be provided in and by the mold or form surface against which the thermosetting resin is applied. Similarly, when the wet lay-up coating method is employed in the practice of the present invention, (as in FIGS. 37 and 38), the mold or form surface can be engraved with any desired texture, pattern, or design, so that when the resinous coatings are applied to the mold or form surface, and the adhesive bonding coating and concrete mix are applied, and the resulting complete article or product is removed from the mold (FIGS. 37 and 38) its surface will have a mirror image of the design or pattern of the mold surface; and
5. In the practice of the present invention, a high degree of reinforcing is obtained by providing a relatively thin or molded or coated resinous surface on the surface of the concrete base component of the new structural units where it is most effective as a reinforcement, which greatly improves the load-bearing characteristics of the resulting structural unit, as distinguished from steel or wire reinforcing which must be sufficiently embedded in the concrete to be protected by a layer of concrete from deterioration by weathering and severe spalling due to cracking.

It will thus be seen from the foregoing description, considered in conjunction with the accompanying drawings, that the present invention provides new and improved structural units and articles and products made therefrom, and a new and improved method of making the same, and that the invention thus has the desirable advantages and characteristics and accomplishes its intended objects including those hereinbefore pointed out and others which are inherent in the invention.

We claim:

1. A method of making a structural unit which includes a first and resinous component and a second component composed of a wet mix material selected from the group consisting of wet mix concrete, lightweight aggregate cements and molding plaster which includes the steps of:

a. wet lay-up coating at least one surface of a mold with a resinous component selected from the group consisting of thermosetting polyesters and polyurethanes to thereby provide a mold surface for forming the second component;

b. coating the mold surface of the resinous component, while the resinous component is still in an uncured state, with an adhesive bonding coating;

c. introducing the selected wet mix into the mold against the adhesive-coated mold surface of the said resinous component while the adhesive coating is still in an uncured state;

d. allowing the said wet mix, the said adhesive bonding coating and the resinous component to cure simultaneously to at least handling state in situ;

e. removing the formed structural unit with at least one surface being the resinous material from said mold.

2. A method in accordance with claim 1 wherein the adhesive coating is an epoxy resin based adhesive which is particularly effective for bonding to wet concrete.

* * * * *